United States Patent
Okura et al.

(10) Patent No.: US 9,250,799 B2
(45) Date of Patent: Feb. 2, 2016

(54) CONTROL METHOD FOR INFORMATION INPUT DEVICE, INFORMATION INPUT DEVICE, PROGRAM THEREFOR, AND INFORMATION STORAGE MEDIUM THEREFOR

(75) Inventors: Junya Okura, Saitama (JP); Toshitake Tsuchikura, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 147 days.

(21) Appl. No.: 13/140,942

(22) PCT Filed: Jun. 30, 2010

(86) PCT No.: PCT/JP2010/061187
§ 371 (c)(1),
(2), (4) Date: Jul. 18, 2011

(87) PCT Pub. No.: WO2011/058783
PCT Pub. Date: May 19, 2011

(65) Prior Publication Data
US 2012/0212429 A1    Aug. 23, 2012

(30) Foreign Application Priority Data
Nov. 10, 2009   (JP) ................................. 2009-257282

(51) Int. Cl.
*G06F 3/041* (2006.01)
*G06F 3/0488* (2013.01)
(Continued)

(52) U.S. Cl.
CPC .......... *G06F 3/04883* (2013.01); *A63F 13/214* (2014.09); *A63F 13/42* (2014.09)

(58) Field of Classification Search
CPC .. G06F 3/0488; G06F 2203/041–2203/04113; G06F 3/04883; A63F 13/42; A63F 13/214
USPC ................... 345/173–178; 178/18.01–18.11; 715/700–702
See application file for complete search history.

(56) References Cited

U.S. PATENT DOCUMENTS

2009/0146968 A1*   6/2009   Narita et al. .................. 345/173
2009/0160793 A1*   6/2009   Rekimoto ..................... 345/173
(Continued)

FOREIGN PATENT DOCUMENTS

JP         07121698 A    5/1995
JP       2006011914 A    1/2006
(Continued)

OTHER PUBLICATIONS

International Preliminary Report on Patentability (Written Opinion) for priority application PCT/JP2010/061187, dated Jun. 21, 2012.
(Continued)

*Primary Examiner* — Gustavo Polo
(74) *Attorney, Agent, or Firm* — Matthew B. Dernier, Esq.

(57) ABSTRACT

Provided is a control method for an information input device capable of facilitating an operation input performed by a user. The control method for an information input device includes: acquiring a moving distance of an object when a user performs a movement operation for moving the object on a detection surface of a touch sensor for detecting a position of the object on the detection surface; acquiring a value regarding an operation mode of the movement operation; and outputting a value calculated based on the acquired moving distance and the acquired value regarding the operation mode, as an operation input amount exhibited in the movement operation performed by the user.

10 Claims, 3 Drawing Sheets

(51) Int. Cl.
*A63F 13/42* (2014.01)
*A63F 13/214* (2014.01)

(56) References Cited

U.S. PATENT DOCUMENTS

| 2010/0039382 A1 | 2/2010 | Kumagai | |
| 2010/0123679 A1* | 5/2010 | Kim et al. | 345/174 |

FOREIGN PATENT DOCUMENTS

| JP | 2007188159 A | 7/2007 |
| JP | 2009539179 A | 11/2009 |
| WO | 2007142764 | 12/2007 |
| WO | 2008149991 A1 | 12/2008 |

OTHER PUBLICATIONS

Office Action for corresponding Korean Patent Application No. 10-2011-7018552, dated Dec. 31, 2012.
International Search Report for corresponding Application PCT/JP2010/-61187, dated Nov. 2, 2010.
Office Action for corresponding Japanese Patent Application No. 2009-257282, dated Oct. 1, 2013.
Office Action for corresponding Chinese Patent Application No. 201080007775.1, dated Jul. 24, 2013.

* cited by examiner

CONTROL METHOD FOR INFORMATION INPUT DEVICE, INFORMATION INPUT DEVICE, PROGRAM THEREFOR, AND INFORMATION STORAGE MEDIUM THEREFOR

TECHNICAL FIELD

The present invention relates to an information input device for receiving an operation input performed by a user, a control method therefor, a program therefor, and an information storage medium therefor.

BACKGROUND ART

An information input device using a touch sensor is known as one of information input devices for receiving an operation input performed by a user to perform various kinds of information processing. The touch sensor is a sensor for detecting a position of an object (for example, a finger of the user or a stylus) in a case where the user brings the object into contact or proximity with a detection surface. When the user performs an operation for, for example, placing his/her own finger on the detection surface of the touch sensor and moving the finger in an arbitrary direction, the information input device can receive the moving direction and a moving distance in the above-mentioned direction as contents of the user's operation input.

SUMMARY OF THE INVENTION

With an information input device which merely receives a moving distance on a touch sensor as a user's operation input, the user may find it difficult to perform an operation input due to a limited variety of operations. For example, in order to continuously perform the operation input in a fixed direction by using such an information input device, the user needs to repeat the same operation by bringing his/her finger or the like into contact with a detection surface of the touch sensor again and again. Alternatively, in order to perform the operation input by a large amount, the user needs to move his/her finger or the like by a large distance to some degree, but such an operation may be difficult to perform depending on a size of the touch sensor or how the user is holding a casing in which the touch sensor is located.

The present invention has been made in view of the above-mentioned circumstances, and an object thereof is to provide an information input device capable of facilitating an operation input in a case where a user uses a touch sensor to perform the operation input, and to provide a control method therefor, a control program therefor, and an information storage medium storing the program.

A control method for an information input device according to the present invention includes: a moving distance acquisition step of acquiring, when a user performs a movement operation for moving an object on a detection surface of a touch sensor for detecting a position of the object on the detection surface, a moving distance of the object exhibited in the movement operation; an operation mode value acquisition step of acquiring a value regarding an operation mode of the movement operation; and an operation input amount output step of outputting a value calculated based on the acquired moving distance and the acquired value regarding the operation mode, as an operation input amount exhibited in the movement operation performed by the user.

Further, an information input device according to the present invention includes: means for acquiring a detected position of an object from a touch sensor for detecting a position of the object on a detection surface; moving distance acquisition means for using the detected position to acquire, when a user performs a movement operation for moving the object on the detection surface, a moving distance of the object exhibited in the movement operation; operation mode value acquisition means for acquiring a value regarding an operation mode of the movement operation; and operation input amount output means for outputting a value calculated based on the acquired moving distance and the acquired value regarding the operation mode, as an operation input amount exhibited in the movement operation performed by the user.

Further, a program according to the present invention is a program for causing a computer to execute: a moving distance acquisition step of acquiring, when a user performs a movement operation for moving an object on a detection surface of a touch sensor for detecting a position of the object on the detection surface, a moving distance of the object exhibited in the movement operation; an operation mode value acquisition step of acquiring a value regarding an operation mode of the movement operation; and an operation input amount output step of outputting a value calculated based on the acquired moving distance and the acquired value regarding the operation mode, as an operation input amount exhibited in the movement operation performed by the user. This program may be stored in a computer-readable information storage medium.

DETAILED DESCRIPTION OF THE PREFERRED EMBODIMENTS

Hereinafter, an embodiment of the present invention is described in detail with reference to the drawings.

Figure 1A:
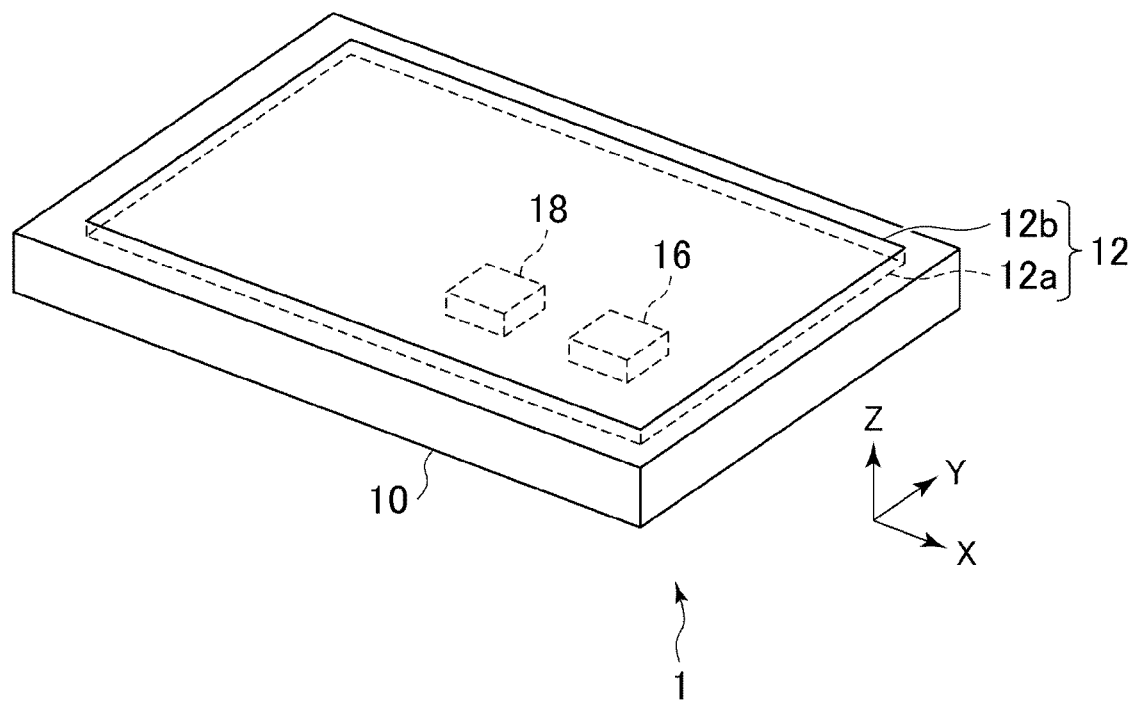
FIG. 1A A perspective view illustrating an external appearance of an information input device according to an embodiment of the present invention.
Figure 1B:
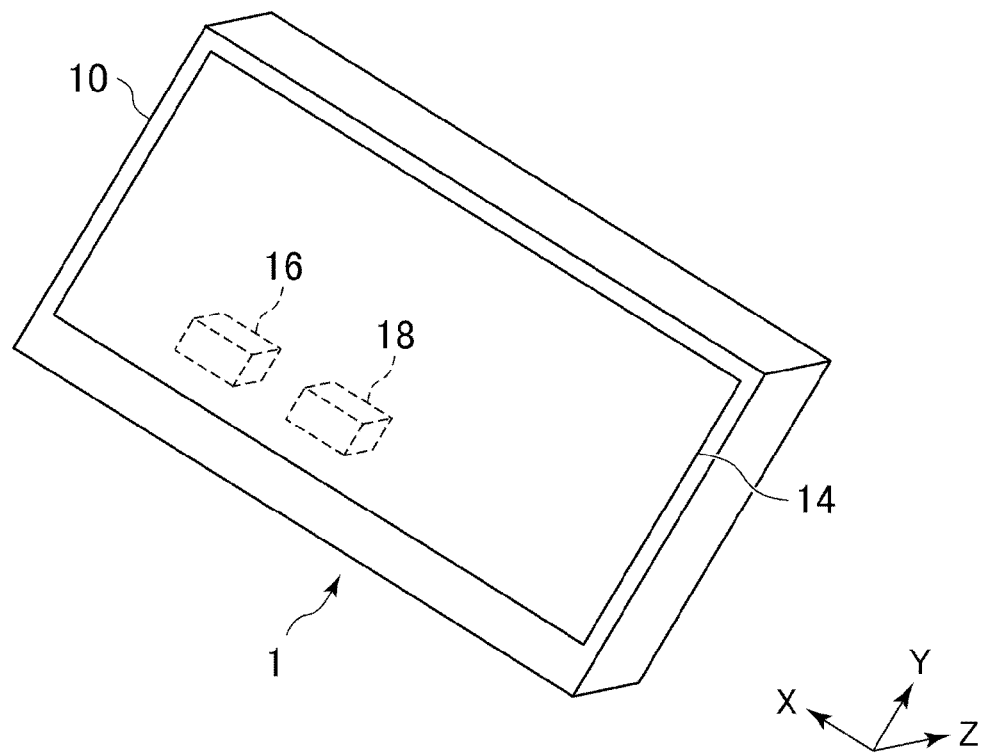
FIG. 1B A perspective view illustrating the external appearance of the information input device according to the embodiment of the present invention.

FIG. 1A and FIG. 1B are perspective views illustrating an external appearance of an information input device 1 according to one embodiment of the present invention. FIG. 1A shows a state of the information input device 1 viewed from a front surface (frontal surface) side thereof, and FIG. 1B shows the state viewed from a back surface thereof. Note that, the following description is directed to a case where the information input device 1 according to this embodiment is a portable game machine.

As illustrated in those figures, a casing 10 of the information input device 1 has a tabular shape that is substantially rectangular as a whole, and is provided with a touch panel 12 on a front surface thereof. The touch panel 12 has a substantially rectangular shape, and includes a display 12a and a front surface touch sensor 12b. The display 12a may be any kind of image display device such as a liquid crystal display panel or an organic EL display panel.

The front surface touch sensor 12b is located so as to be superposed on the display 12a, and is provided with a substantially rectangular detection surface having a shape and a size that correspond to a display surface of the display 12a. When an object such as a finger of a user or a stylus is brought into contact with the detection surface, the front surface touch sensor 12b detects a contact position of the object therewith. Note that, the front surface touch sensor 12b does not necessarily detect the position of the object only when the object is brought into contact with the detection surface, but may detect the position of the object with respect to the detection surface also when the object is brought into proximity with the detection surface within a detectable range. Further, the front surface touch sensor 12b may be of any system, for example, a capacitive, pressure-sensitive, or optical system, as long as the front surface touch sensor 12b is a device that can detect the position of the object on the detection surface. In addition, the front surface touch sensor 12b may have a pressure-sensing function of detecting a pressure with which the object depresses the detection surface when the object is brought into contact with the detection surface. Alternatively, in a case where the front surface touch sensor 12b is a multi-point sensing touch sensor that can sense contact in a plurality of sites, the information input device 1 may sense a strength with which the object is pressed against the touch sensor based on a range of positions in which the contact of the object is sensed. In a case where a soft object such as the finger of the user is brought into contact with the detection surface, a contact area of the object normally becomes larger as the strength with which the object is pressed against the detection surface increases. Therefore, by analyzing a distribution of the contact positions of the object on the detection surface in a software manner, the information input device 1 can acquire an index value regarding the pressure of the object in a simulated manner even if the front surface touch sensor 12b has no function capable of directly sensing the pressure of the object.

Further, in this embodiment, a back surface touch sensor 14 is located on the back surface side of the casing 10 so as to face the touch panel 12. The back surface touch sensor 14 is provided with a substantially rectangular detection surface having a shape and a size that correspond to the display surface of the display 12a. That is, the display surface of the display 12a, the detection surface of the front surface touch sensor 12b, and the detection surface of the back surface touch sensor 14 each have substantially the same shape and substantially the same size, and are aligned in a straight line along a thickness direction (Z-axis direction) of the casing 10. Note that, the back surface touch sensor 14 may be of any kind of system in the same manner as the front surface touch sensor 12b, and may have a pressure-sensing function. The user can perform an operation input with respect to the information input device 1 by bringing his/her own finger, a stylus held by the hand, or the like into contact or proximity with the detection surface of the front surface touch sensor 12b or the back surface touch sensor 14.

Here, the location position, the size, and the shape of the back surface touch sensor 14 correspond to those of the display 12a, and hence the user can also use the back surface touch sensor 14 in place of the front surface touch sensor 12b in order to perform an operation input with respect to an image displayed on the display 12a. By using the back surface touch sensor 14 for performing an operation input with respect to the image displayed on the display 12a, it can be avoided that it becomes difficult to view the image displayed on the display 12a due to a shadow cast by the finger, the stylus, or the like brought into contact with the touch sensor.

Note that, although not illustrated in FIG. 1A or FIG. 1B, the information input device 1 may also be provided with various operation members for receiving the user's operation input, such as buttons and switches, on a front surface, a back surface, side surfaces, and the like of the casing 10 in addition to the front surface touch sensor 12b and the back surface touch sensor 14.

Further, the information input device 1 includes an acceleration sensor 16 and a gyroscope 18 that are located inside the casing 10 in order to detect a posture of the casing 10. The acceleration sensor 16 is a three-axis acceleration sensor, and senses accelerations caused in directions of three reference axes (X-axis, Y-axis, and Z-axis) set for the casing 10. Here, the three reference axes are substantially orthogonal to one another with the X-axis, Y-axis, and Z-axis being set to a long-side direction of the touch panel 12, a short-side direction of the touch panel 12, and the thickness direction of the casing 10, respectively. When the acceleration sensor 16 senses the accelerations caused in the respective reference axes due to gravity, the information input device 1 can sense its own posture (that is, inclination of the casing 10 to a vertical direction in which gravity acts). The information input device 1 can also sense its own movement by causing the acceleration sensor 16 to sense the acceleration caused due to a change in moving speed thereof.

The gyroscope 18, which is a piezoelectric vibration type gyro or the like, senses angular velocities of rotation made about three gyro reference axes set for the casing 10, and outputs electrical signals corresponding to the sensed angular velocities. Note that, the directions of the gyro reference axes may be the same directions of the above-mentioned three reference axes of the acceleration sensor 16. By integrating the angular velocity sensed by the gyroscope 18, the information input device 1 can calculate a rotation angle of the casing 10 relative to the X-axis, the Y-axis, and the Z-axis.

Figure 2:
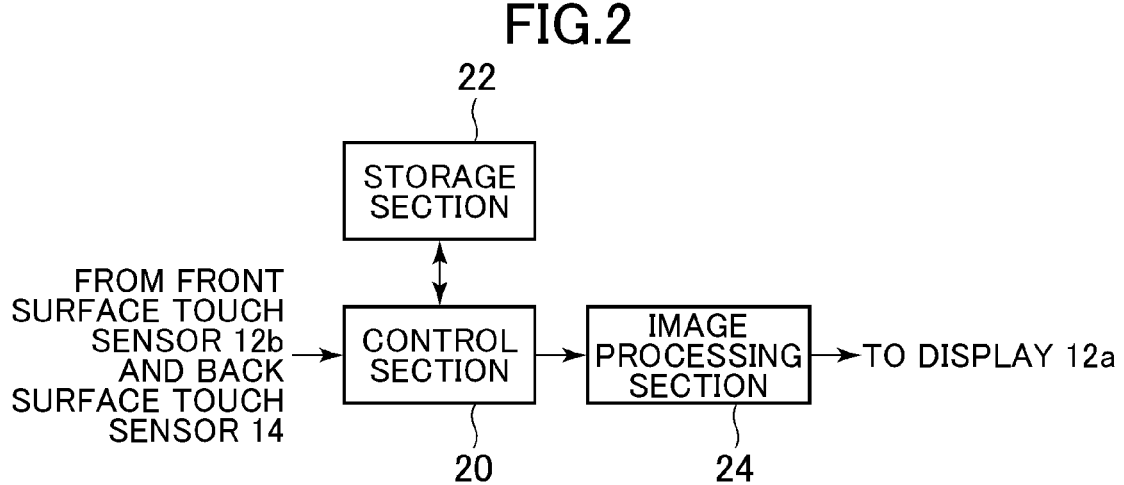
FIG. 2 A block diagram illustrating an internal configuration of the information input device according to this embodiment.

FIG. 2 is a configuration block diagram illustrating an internal configuration of the information input device 1. As illustrated in the figure, the information input device 1 includes a control section 20, a storage section 22, and an image processing section 24. The control section 20 is, for example, a CPU, and executes various kinds of information processing according to a program stored in the storage section 22. The storage section 22 is, for example, a memory element such as a RAM or a ROM or a disk device, and stores the program executed by the control section 20 and various kinds of data. Further, the storage section 22 also functions as a work memory of the control section 20.

The image processing section 24 includes, for example, a GPU and a frame buffer memory, and renders an image to be displayed on the display 12a according to an instruction output by the control section 20. As a specific example, the image processing section 24 includes a frame buffer memory corresponding to a display region of the display 12a, and the GPU writes the image to the frame buffer memory every predetermined time according to the instruction from the control section 20. Then, the image written to the frame buffer memory is converted into a video signal at a predetermined timing, and displayed on the display 12a.

In this embodiment, the control section 20 receives detection results obtained by the front surface touch sensor 12b and the back surface touch sensor 14, and uses the received detection results to execute various kinds of processing. Specifically, the control section 20 determines contents of the user's operation input by using the detection result of the position of the object such as the finger of the user or the stylus which is obtained by at least one of the front surface touch sensor 12*b* and the back surface touch sensor 14. Then, the control section 20 executes processing corresponding to the determined contents of the operation input, and presents the user with a processing result by displaying the processing result on the display 12*a*.

Figure 3:
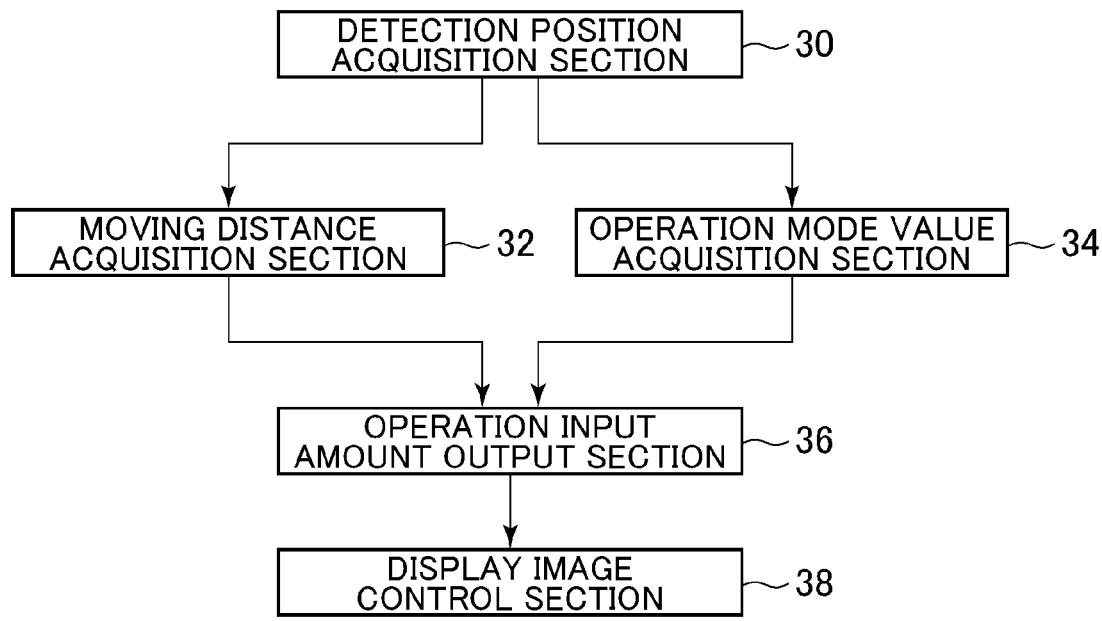
FIG. 3 A functional block diagram illustrating an example of functions of the information input device according to this embodiment.

Hereinafter, a specific example of the processing executed by the control section 20 in this embodiment is described. It is assumed below that the control section 20 performs processing for updating the image displayed on the display 12*a* according to a change over time in the position of the finger of the user detected by the back surface touch sensor 14. In order to execute such processing, as illustrated in FIG. 3, the information input device 1 functionally includes a detection position acquisition section 30, a moving distance acquisition section 32, an operation mode value acquisition section 34, an operation input amount output section 36, and a display image control section 38. Those functions are implemented by the control section 20 executing a program stored in the storage section 22. The program may be provided by being stored in any kind of computer-readable information storage medium such as an optical disk or a memory card, or may be provided to the information input device 1 via a communication network such as the Internet.

The detection position acquisition section 30 acquires a coordinate value output by the back surface touch sensor 14 that has detected the position of the object (here, finger of the user). In this embodiment, when the position of the object is detected, the back surface touch sensor 14 outputs the coordinate value indicating the detected position. Note that, the coordinate value output by the back surface touch sensor 14 is assumed to be a two-dimensional coordinate value (px, py) indicating position coordinates within a detection region having a rectangular shape. The detection position acquisition section 30 reads the coordinate value output by the back surface touch sensor 14 every predetermined time, and stores the coordinate values in the storage section 22 in order. This produces a coordinate value string indicating a positional movement (change over time) of the finger of the user.

The moving distance acquisition section 32 uses the coordinate value string acquired by the detection position acquisition section 30 to acquire a moving distance D of the movement operation performed by the user. Here, the movement operation represents an operation performed by the user for moving his/her own finger on the detection surface of the back surface touch sensor 14. For example, the moving distance acquisition section 32 calculates, as the moving distance D of the finger of the user, the distance from a reference position P1 to a present position P2 on the detection surface every predetermined time with the present position P2 being set to the position of the finger of the user detected at this time point and the reference position P1 being set to a position determined by a method described later. Note that, in this embodiment, the moving distance acquisition section 32 acquires the moving distance D, and also acquires a direction of the present position P2 relative to the reference position P1 as information on the moving direction. Further, a time interval at which the moving distance acquisition section 32 acquires the moving distance D may be the same as or different from a time interval at which the detection position acquisition section 30 acquires the coordinate value indicating the detected position.

Here, a specific example of the method of determining the reference position P1 is described. The reference position P1 may be a position (for example, central position of the detection surface) defined within the detection surface in advance. In this case, it is assumed that the user always starts the movement operation at the same reference position.

Figure 4:
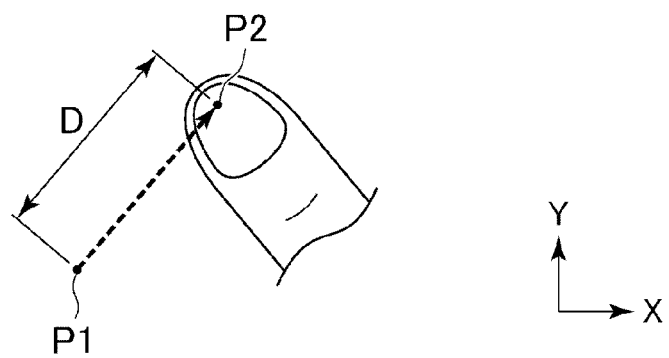
FIG. 4 A diagram illustrating an example of a method of setting a reference position.

Further, when the detection of the object is started for the first time in a state in which the back surface touch sensor 14 has not detected the object so far, the moving distance acquisition section 32 may set the position of the object detected at a time point when the detection of the object is started (that is, time point when the user starts the operation) as the reference position P1. Specifically, when the detection position acquisition section 30 acquires the coordinate value indicating the position detected by the back surface touch sensor 14 at a timing immediately after a given time point at which the detection position acquisition section 30 cannot acquire the coordinate value indicating the position detected by the back surface touch sensor 14, the detected position is set as the reference position P1. This allows the user to perform the operation input irrespective of the position of his/her finger on the detection surface by performing an operation for sliding his/her finger on the detection surface from the position. FIG. 4 is a diagram illustrating a relationship among a locus (dashed arrow) of the finger of the user on the detection surface, the reference position P1, the present position P2, and the moving distance D in a case where the reference position P1 is set as described above.

After the reference position P1 is thus determined, in a case where the back surface touch sensor 14 continuously keeps detecting the object, the moving distance acquisition section 32 repeatedly executes the processing for calculating the moving distance D from the reference position P1 to the present position P2 every predetermined time with the present position P2 being set to the detected position of the object acquired by the detection position acquisition section 30 at this time point. Therefore, the moving distance acquisition section 32 regularly calculates and outputs the value of the moving distance D that gradually increases as the user moves his/her finger from the reference position P1 so as to trace the detection surface of the back surface touch sensor 14.

Figure 5A:
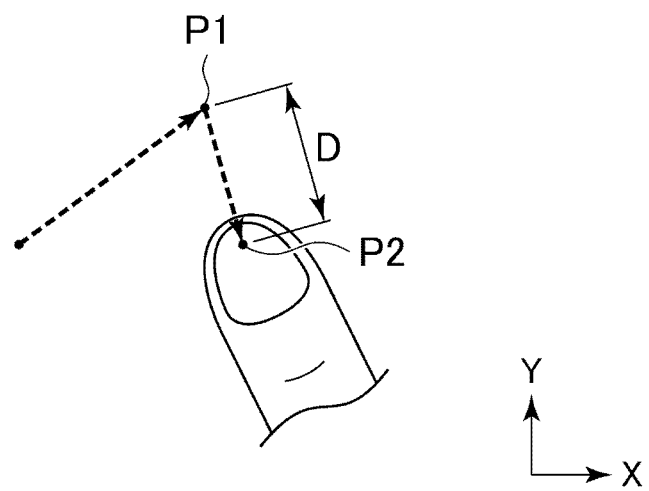
FIG. 5A A diagram illustrating another example of the method of setting the reference position.

In addition, when the detected position of the object changes in moving direction in a state in which the back surface touch sensor is continuously detecting the object, the moving distance acquisition section 32 may set the position of the object detected at the time point of the change as the reference position P1. Specifically, for example, the moving distance acquisition section 32 determines that the moving direction of the finger of the user changes when any one of an X-axis component and a Y-axis component of the moving direction of the finger of the user is reversed between positive and negative, and sets the position detected at the time point of the reversal as a new reference position P1. In this example, the reference position P1 is reset when an X-axis coordinate value (or Y-axis coordinate value) of the detected position which has been increasing so far turns to decrease or when the X-axis coordinate value (or Y-axis coordinate value) which has been decreasing so far turns to increase. FIG. 5A is a diagram illustrating a relationship among loci (dashed arrows) of the finger of the user on the detection surface, the reference position P1, the present position P2, and the moving distance D in a case where the reference position P1 is set as described above. Note that, even when the moving direction of the finger of the user changes to some degree, if there is no change in moving direction along the reference axes (X-axis and Y-axis), as long as the X-axis component and the Y-axis component are each monotonously increasing or monotonously decreasing, the moving distance acquisition section 32 may continue calculating the moving distance D without changing the reference position P1 used so far on the assumption that there is no change in moving direction.

Figure 5B:
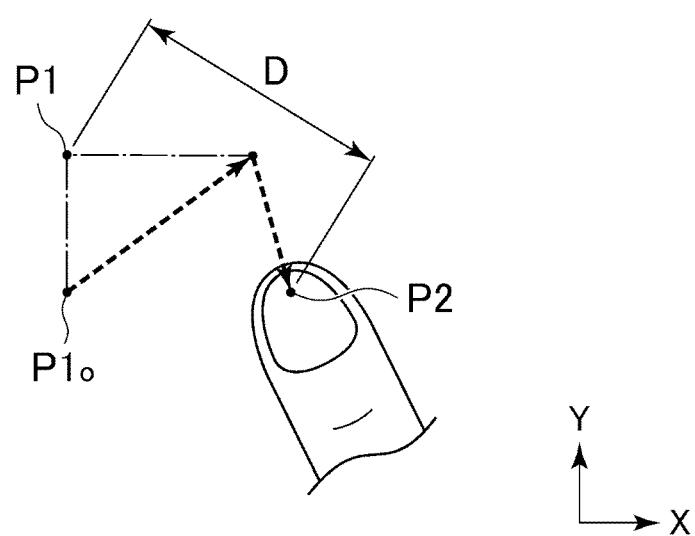
FIG. 5B A diagram illustrating further another example of the method of setting the reference position.

Note that, when there is a change in moving direction of the finger of the user along the predetermined reference axis (X-axis or Y-axis), instead of setting the position itself of the finger of the user detected at the time point of the change as the new reference position P1, the moving distance acquisition section 32 may set a position on the detection surface corresponding to the detected position as the new reference position P1. For example, if there is a change in moving direction of the detected position, the moving distance acquisition section 32 may update the X-axis coordinate value and the Y-axis coordinate value of the reference position P1 independently of each other. That is, when the X-axis component of the moving direction of the finger of the user changes from a positive direction to a negative direction or from the negative direction to the positive direction, the moving distance acquisition section 32 sets the X-axis coordinate value of the position detected at the time point of the change as the X-axis coordinate value of the new reference position P1. Meanwhile, if there is no change in Y-axis component of the moving direction, the value set so far is maintained without a change in Y-axis coordinate value of the reference position P1. FIG. 5B illustrates the reference position P1 set in this example when the user moves his/her finger in the same manner as in FIG. 5A. In the example of FIG. 5B, the Y-axis component of the moving direction changes from the positive direction to the negative direction, and hence the Y-axis coordinate value of the reference position P1 is updated, while the moving direction in terms of the X-axis direction is always the positive direction without a change, and hence the X-axis coordinate value of the reference position P1 is not updated. As a result, the reference position P1 to be newly set moves along the Y-axis direction when viewed from the original reference position P1o, and the moving distance acquisition section 32 acquires the distance from the new reference position P1 as the moving distance D.

The operation mode value acquisition section 34 acquires a value regarding an operation mode (operation mode value) of the movement operation performed by the user. In the following description, the operation mode value acquisition section 34 acquires the value of a moving speed V of the movement operation performed by the user as the operation mode value. Note that, the operation mode value acquisition section 34 acquires the operation mode value every predetermined time. The time interval used in this case may be the same as or different from the time interval at which the moving distance acquisition section 32 acquires the moving distance D.

Specifically, the operation mode value acquisition section 34 uses the coordinate value string acquired by the detection position acquisition section 30 to acquire the moving speed V of the movement operation performed by the user. For example, every predetermined time, the operation mode value acquisition section 34 calculates the moving speed V of the finger of the user immediately before this time point. In this case, the operation mode value acquisition section 34 calculates the distance between the position of the finger of the user at the time point when the moving speed V is acquired (that is, present position P2) and the position of the finger of the user at a past time point preceding this time point by a predetermined unit time tu. Then, the value obtained by dividing the calculated distance by the unit time tu is calculated as the latest moving speed V of the finger of the user. Note that, assuming that the unit time tu is 1, a numerical value of the calculated distance itself represents the moving speed V.

Alternatively, the operation mode value acquisition section 34 may calculate the moving speed V of the finger of the user by using the reference position P1 and the present position P2 that are used when the moving distance acquisition section 32 acquires the moving distance D. In this example, the operation mode value acquisition section 34 calculates the moving speed V of the finger of the user by using a time instant T1 at which the finger of the user is last detected at the reference position P1 and a time instant T2 at which the finger of the user is detected at the present position P2 for the first time since the time instant T1. That is, the moving speed V of the finger of the user exhibited within a range from the reference position P1 to the present position P2 is calculated by dividing the distance from the reference position P1 to the present position P2 by a time (T2-T1). Note that, in this case, the time instant T2 is not limited to the present time instant at which the moving speed V is acquired, and if the finger of the user has reached the present position P2 at a time point prior thereto, the time point of the reach is used as the time instant T2.

Further, as has already been described, the operation mode value acquisition section 34 may acquire not only the moving speed V but also the value regarding another operation mode. For example, if the back surface touch sensor 14 has a pressure-sensing function, the operation mode value acquisition section 34 may acquire a value indicating a pressure with which the user presses his/her own finger against the detection surface, which is detected by the back surface touch sensor 14, as the operation mode value. In this case, the value of the pressure acquired by the operation mode value acquisition section 34 may be the value of the pressure detected in the past nearest to the time point when the value is acquired, or may be an average value of the values of the pressures detected while the finger of the user is moving from the reference position P1 to the present position P2. Further, as has already been described, the size of the contact area of the finger with respect to the detection surface of the touch sensor is considered to indicate a strength with which the user presses his/her finger against the detection surface during the movement operation. Therefore, the operation mode value acquisition section 34 may acquire the size of the contact area as the operation mode value.

The operation input amount output section 36 outputs a value calculated based on the moving distance D acquired by the moving distance acquisition section 32 and the operation mode value (here, moving speed V of the finger of the user) acquired by the operation mode value acquisition section 34 as an operation input amount I based on the operation performed by the user. That is, the value calculated by using both the moving distance D and the moving speed V is output as the value indicating the amount of the movement operation performed by the user. Note that, in addition to the value of the operation input amount I, the operation input amount output section 36 acquires the direction of the movement operation performed by the user (that is, direction of the present position P2 relative to the reference position P1) from the moving distance acquisition section 32, and outputs the direction as the direction specified by the user.

Specifically, the operation input amount output section 36 calculates the value of the operation input amount I so that the value of the operation input amount I becomes larger as the moving distance D becomes larger and as the moving speed V becomes larger. For example, the operation input amount output section 36 calculates the value of the operation input amount I by combining the value calculated based on the value of the moving distance D and the value calculated based on the value of the moving speed V. With this configuration, for example, even when the user performs the movement operation for moving his/her finger by the same moving distance D, the value of the operation input amount I can be made larger if the operation is performed quickly than if performed slowly. Accordingly, the range of the operation input amount I that can be received as the operation input from the user becomes larger than in a case where the operation input amount I is calculated merely based on only the moving distance D. Further, the user can adjust a level of the operation input amount I by adjusting at least one of the moving distance D and the moving speed V. That is, in order to input a relatively large value of the operation input amount I, the finger may be moved by a large distance or may be moved quickly.

Here, a specific example of a method in which the operation input amount output section 36 calculates the value of the operation input amount I is described. For example, the operation input amount output section 36 calculates the value of the operation input amount I by multiplying the moving distance D and the moving speed V by predetermined coefficients A1 and A2, respectively, and summing the results. In this case, the value of the operation input amount I is calculated by the following equation.

$$I = A1 \cdot D + A2 \cdot V$$

Further, the operation input amount output section 36 may calculate the value of the operation input amount I by using the powers of the moving distance D and the moving speed V in order to emphasize the effect based on the levels of the values of the moving distance D and the moving speed V (that is, in order to increase an influence exerted on the operation input amount I when the moving distance D and the moving speed V are greatly changed). Specifically, for example, the value of the operation input amount I is calculated by the following equation.

$$I = A1 \cdot D^2 + A2 \cdot V^2$$

With this configuration, the change in value of the operation input amount I depending on the changes in values of the moving distance D and the moving speed V is relatively small when absolute values of the moving distance D and the moving speed V are small, but when the absolute values of the moving distance D and the moving speed V become large, the change in value of the operation input amount I depending on the changes in values of the moving distance D and the moving speed V becomes relatively large. Note that, the power is used for both the moving distance D and the moving speed V here, but the power may be used for only one thereof (one whose effect is to be more emphasized) to perform the summation without using the power of the other.

Further, if the value of the moving distance D acquired by the moving distance acquisition section 32 exceeds a predetermined upper limit value Dth, the operation input amount output section 36 may calculate the value of the operation input amount I by using the upper limit value Dth as the value of the moving distance D. With this configuration, even if the user moves his/her finger by the upper limit value Dth or larger in order to perform the operation input at a high moving speed V, the value of the moving distance D used for the calculation of the operation input amount I can be suppressed to the upper limit value Dth.

Further, instead of using the numerical value of the moving distance D acquired by the moving distance acquisition section 32 and the numerical value of the moving speedy acquired by the operation mode value acquisition section 34 for the arithmetic operation as they are, the operation input amount output section 36 may determine which of a plurality of numerical value ranges the respective numerical values belong to, and may calculate the value of the operation input amount I based on results thereof. For example, the operation input amount output section 36 determines that the finger of the user is substantially stopped if the value of the moving speed V is smaller than a predetermined first threshold value Vth1, determines that the finger of the user is moving at low speed if the value of the moving speed V is equal to or larger than the first threshold value Vth1 and smaller than a second threshold value Vth2, and determines that the finger of the user is moving at high speed if the value of the moving speed V is equal to or larger than the second threshold value Vth2. Then, based on a result of the determination, a predetermined correction value that is different according to the result may be added to the numerical value of the moving distance D to thereby calculate the value of the operation input amount I.

The display image control section 38 updates the image displayed on the display 12a based on the value of the operation input amount I output by the operation input amount output section 36. For example, the display image control section 38 updates the display image so as to move an image element within the display image displayed on the display screen of the display 12a by an amount corresponding to the value of the operation input amount I output by the operation input amount output section 36. The image element may be various objects arranged within a virtual space or icons and the like within a menu screen. In this embodiment, the display image control section 38 is implemented by the control section 20 executing a game application program, and displays a game image that changes according to the user's operation input on the display 12a. Specifically, the display image control section 38 arranges the objects such as a game character object and a background object within a virtual three-dimensional space, and instructs the image processing section 24 to render an image indicating a state within the virtual three-dimensional space. The GPU within the image processing section 24 generates the image according to the instruction and writes the image to the frame buffer to thereby display a game image on the display 12a. Here, it is assumed that a viewpoint position and a line-of-sight direction are set within the virtual three-dimensional space, and the image indicating the state of the virtual three-dimensional space viewed from the viewpoint position toward the line-of-sight direction is rendered.

In addition, the display image control section 38 updates contents of the game image based on the value of the operation input amount I output by the operation input amount output section 36 and the direction specified by the user. Specifically, the display image control section 38 changes the line-of-sight direction set in the virtual three-dimensional space into the direction specified by the user at a speed proportional to the value of the operation input amount I. Accordingly, the user can change the direction of a line of sight in the displayed game image at the speed corresponding to the moving distance and the moving speed of the movement operation performed with respect to the back surface touch sensor 14, and the respective objects within the game image are to move within the game image by the amount corresponding to the value of the operation input amount I.

According to this embodiment as described above, it is possible to increase the variety of operations performed by the user and facilitate the operation input. For example, by placing his/her finger on one point on the detection surface of the back surface touch sensor 14 and sliding his/her finger from the one point toward an arbitrary direction, the user can specify the direction with the same operation feeling as when tilting an analog stick. According to such a movement operation, for example, the information input device 1 performs processing for changing the line-of-sight direction set in the virtual three-dimensional space into the direction corresponding to the direction of the movement operation. Further, the user can perform the operation input by a large amount by quickly moving his/her finger toward one given direction. Accordingly, the information input device 1 performs processing for changing the line-of-sight direction instantaneously at high speed or other such processing.

In addition, in a case where the moving speed of the finger in the nearest past is used as the moving speed V, if the user performs an operation for moving his/her finger toward a fixed direction on the detection surface and stopping the movement thereof without bringing his/her finger off the detection surface, the moving distance D relative to the reference position P1 maintains a fixed value while the moving speed V becomes zero. Accordingly, it is possible to continue the operation input toward the arbitrary direction without repeating the same operation again and again. In addition, in this case, a relatively small operation input amount I is output after a large operation input amount I is temporarily output due to the influence of the moving speed V, and hence the operation input that changes from a large value to a small value can be easily performed without involving a complicated movement of the finger. At this time, on the assumption that the calculation of the operation input amount I is performed with the moving distance D being the upper limit value Dth, after the operation input amount I having a large value is temporarily output according to the user's quick operation input, the operation input amount I having a predetermined value corresponding to the moving speed V=0 and the moving distance D=Dth is output, and hence the operation input amount I that has temporarily increased can be settled to a predetermined value or smaller. Further, in a case where the moving speed of the movement from the reference position P1 to the present position P2 is used as the value of the moving speed V, if the user similarly performs the operation for moving his/her finger toward the fixed direction on the detection surface and stopping the movement thereof, the value of the operation input amount I to which the value corresponding to the moving speed V is added continues to be output. Therefore, in the case where the user moves his/her finger quickly to the present position P2, the large value of the operation input amount I exhibited at that time is maintained as it is, and it is possible to continue to allow the movement in the line-of-sight direction at high speed, for example.

Note that, the embodiment of the present invention is not limited to the one that has been described above. For example, in the above description, the operation input amount I is calculated by using the values of the two-dimensional moving distance D on the detection surface of the back surface touch sensor 14 and the moving speed V, but the information input device 1 may perform the above-mentioned processing assuming that a change in positions obtained by projecting the locus of the user's movement operation toward the reference axes (here, X-axis and Y-axis) is the operation input. Specifically, the detection position acquisition section 30 acquires the detected position of the finger of the user as a two-dimensional coordinate value (px, py), and hence two coordinate value strings, namely, an X-axis coordinate value string {px1, px2, px3, . . . } and a Y-axis coordinate value string {py1, py2, py3, . . . }, are obtained. The information input device 1 may perform the acquisition of the moving distance D and the moving speed V and the calculation of the operation input amount I, which are described above, for the respective two coordinate value strings independently of each other.

In this case, for example, when first detecting the position of the finger of the user, the moving distance acquisition section 32 sets the X-axis coordinate value of the detected position as an X-axis reference position P1$x$ and the Y-axis coordinate value as a Y-axis reference position P1$y$. Then, the moving distance acquisition section 32 acquires a moving distance Dx in the X-axis direction relative to the X-axis reference position P1$x$ and a moving distance Dy in the Y-axis direction relative to the Y-axis reference position P1$y$ independently. Further, the operation mode value acquisition section 34 acquires a moving speed Vx of the finger of the user along the X-axis direction and a moving speed Vy of the finger of the user along the Y-axis direction independently. Then, the operation input amount output section 36 calculates an operation input amount Ix in the X-axis direction by using the moving distance Dx and the moving speed Vx and calculates an operation input amount Iy in the Y-axis direction by using the moving distance Dy and the moving speed Vy independently. This allows the calculation of the moving distances Dx and Dy and the moving speeds Vx and Vy to be performed with a relatively small amount of arithmetic operation.

Further, in the above description, the display image control section 38 changes the line-of-sight direction according to the user's operation input, but the present invention is not limited thereto, and the operation input amount I may be used for changing various positions and directions. Specifically, for example, the display image control section 38 may move the viewpoint position set within the virtual three-dimensional space and may move the position of a user character within the virtual three-dimensional space based on the direction specified by the user and the value of the operation input amount I. Further, the operation input amount I may not only be used for updating the image indicating the state within the virtual three-dimensional space but also be used as a parameter for various kinds of information processing such as a scroll amount for processing for scrolling the display image.

Further, in the above description, the moving distance D and the moving speed V of the movement operation performed with respect to the back surface touch sensor 14 are used for the calculation of the operation input amount I, but the present invention is not limited thereto, and the same processing may be executed by using the moving distance D and the moving speed V of the movement operation performed with respect to the front surface touch sensor 12*b*. Further, the information input device according to the embodiment of the present invention does not need to include the touch sensor that allows the user to directly perform an operation. For example, the information input device according to the embodiment of the present invention may be an information input device connected to an operation device including the touch sensor, such as a home-use game machine or a personal computer. In this case, the information input device calculates the moving distance D and the moving speed V based on information on the detected position of the object which is transmitted from the operation device.

The invention claimed is:

1. A control method for an information input device, comprising:
    acquiring, when a user performs a movement operation for moving an object on a detection surface of a touch sensor for detecting a position of the object on the detection surface, a moving distance of the object on the detection surface during the movement operation, where the moving includes sliding movement of the object across the detection surface of the touch sensor, and where the moving distance of the object is acquired from a reference position, defined as a position of the object when acquiring the moving distance is not carried out, and a present position, defined as a position of the object taken at the time of acquiring the moving distance;

acquiring a value regarding an operation mode of the movement operation comprising a value indicating a moving speed of the object sliding across the detection surface of the touch sensor during the movement operation; and outputting a value calculated based on the acquired moving distance and the acquired value regarding the operation mode, as an operation input amount exhibited during the movement operation performed by the user.

2. The control method for an information input device according to claim 1, wherein the step of acquiring the value indicating the moving speed of the object includes obtaining the moving speed of the object immediately before a time point at which the acquisition is initiated.

3. The control method for an information input device according to claim 1, wherein the step of acquiring the moving distance comprises acquiring the moving distance of the object from a reference position to a present position, when there is a change in moving direction of the detected position of the object along a predetermined reference axis, with the reference position being set to a position corresponding to the position of the object detected at a time point of the change and with the present position being set to a position of the object detected at a time point when the moving distance is acquired.

4. The control method for an information input device according to claim 3, wherein the step of acquiring the moving distance further comprises acquiring the moving distance of the object from the reference position to the present position by determining the reference position so that positional coordinates of the position of the object along the predetermined reference axis detected at the time point of the change become positional coordinates of the reference position along the predetermined reference axis.

5. The control method for an information input device according to claim 1, wherein the step of acquiring the moving distance comprises acquiring the moving distance of the object from a reference position to a present position, when there is a change in moving direction of the detected position of the object, with the reference position being set to a position of the object detected at a time point of the change and with the present position being set to a position of the object detected at a time point when the moving distance is acquired.

6. The control method for an information input device according to claim 1, wherein the step of outputting the calculated value comprises calculating the value of the operation input amount, in a case where the moving distance exceeds a predetermined value, by using the predetermined value as a value of the moving distance.

7. The control method for an information input device according to claim 1, further comprising moving an image element within an image displayed on a display screen by an amount corresponding to the output operation input amount.

8. An information input device, comprising:

an acquiring unit configured to acquire a detected position of an object from a touch sensor for detecting a position of the object on a detection surface;

a moving distance acquisition unit configured to use the detected position to acquire, when a user performs a movement operation for moving the object on the detection surface, a moving distance of the object on the detection surface during the movement operation, where the moving includes sliding movement of the object across the detection surface of the touch sensor, and where the moving distance of the object is acquired from a reference position, defined as a position of the object when acquiring the moving distance is not carried out, and a present position, defined as a position of the object taken at the time of acquiring the moving distance;

an operation mode value acquisition unit configured to acquire a value regarding an operation mode of the movement operation comprising a value indicating a moving speed of the object sliding across the detection surface of the touch sensor during the movement operation; and operation input amount output unit configure to output a value calculated based on the acquired moving distance and the acquired value regarding the operation mode, as an operation input amount exhibited during the movement operation performed by the user.

9. An apparatus, comprising:

a computer and a computer program that is executed by the computer, which causes the apparatus to carry out actions, comprising:

acquiring, when a user performs a movement operation for moving an object on a detection surface of a touch sensor for detecting a position of the object on the detection surface, a moving distance of the object on the detection surface during the movement operation, where the moving includes sliding movement of the object across the detection surface of the touch sensor, and where the moving distance of the object is acquired from a reference position, defined as a position of the object when acquiring the moving distance is not carried out, and a present position, defined as a position of the object taken at the time of acquiring the moving distance;

acquiring a value regarding an operation mode of the movement operation comprising a value indicating a moving speed of the object sliding across the detection surface of the touch sensor during the movement operation; and outputting a value calculated based on the acquired moving distance and the acquired value regarding the operation mode, as an operation input amount exhibited during the movement operation performed by the user.

10. A computer-readable, non-transitory information storage medium storing a program for causing a computer to execute actions, comprising:

acquiring, when a user performs a movement operation for moving an object on a detection surface of a touch sensor for detecting a position of the object on the detection surface, a moving distance of the object on the detection surface during the movement operation, where the moving includes sliding movement of the object across the detection surface of the touch sensor, and where the moving distance of the object is acquired from a reference position, defined as a position of the object when acquiring the moving distance is not carried out, and a present position, defined as a position of the object taken at the time of acquiring the moving distance;

acquiring a value regarding an operation mode of the movement operation comprising a value indicating a moving speed of the object sliding across the detection surface of the touch sensor during the movement operation; and outputting a value calculated based on the acquired moving distance and the acquired value regarding the operation mode, as an operation input amount exhibited during the movement operation performed by the user.

* * * * *